(12) United States Patent
Mossoba et al.

(10) Patent No.: US 11,055,642 B1
(45) Date of Patent: Jul. 6, 2021

(54) VERIFICATION OF PROOF OF WORK USING COMPUTER VISION AND/OR MACHINE LEARNING

(71) Applicant: Capital One Services, LLC, McLean, VA (US)

(72) Inventors: Michael Mossoba, Arlington, VA (US); Abdelkader M'Hamed Benkreira, New York, NY (US); Latika Gulati, Annandale, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/777,397

(22) Filed: Jan. 30, 2020

(51) Int. Cl.
  *G06Q 10/06* (2012.01)
  *G06N 20/00* (2019.01)

(52) U.S. Cl.
  CPC ......... *G06Q 10/0631* (2013.01); *G06N 20/00* (2019.01)

(58) Field of Classification Search
  CPC ............................ G06Q 10/0631; G06N 20/00
  See application file for complete search history.

(56) References Cited

U.S. PATENT DOCUMENTS

| | | | | |
|---|---|---|---|---|
| 2002/0046112 A1* | 4/2002 | Nitta | ................... | G06Q 30/0255 705/14.53 |
| 2006/0265295 A1* | 11/2006 | Feanny | ............... | G06Q 10/1091 705/32 |
| 2016/0180295 A1* | 6/2016 | Smith | ................... | H04W 12/08 705/32 |
| 2019/0370364 A1* | 12/2019 | Casatelli | ................ | G06Q 40/08 |
| 2020/0184098 A1* | 6/2020 | Andrasick | ............ | G06K 9/6271 |

FOREIGN PATENT DOCUMENTS

GB  2523213  *  8/2015

OTHER PUBLICATIONS

Deloitte, "Using smart glasses and augmented reality head-mounted displays to drive supply chain innovation," 2018.

* cited by examiner

*Primary Examiner* — Nadja N Chong Cruz
(74) *Attorney, Agent, or Firm* — Harrity & Harrity, LLP

(57) ABSTRACT

A device receives image data associated with an environment of an individual and identifies verifiable content by processing the image data. The device processes the verifiable content to determine a likelihood that the individual is an employee or agent of an organization and to determine a set of likelihoods of the environment being a work environment. The device determines, based on the likelihood and the set of likelihoods, a number of verifiable hours worked by the individual during a given time period. The device identifies wages data that specifies a number of hours worked that has been credited to the individual for the given time period, determines that an amount of wages paid to the individual is an incorrect amount of wages, and provides an alert to another device that indicates that the amount of wages paid to the individual is the incorrect amount of wages.

20 Claims, 8 Drawing Sheets

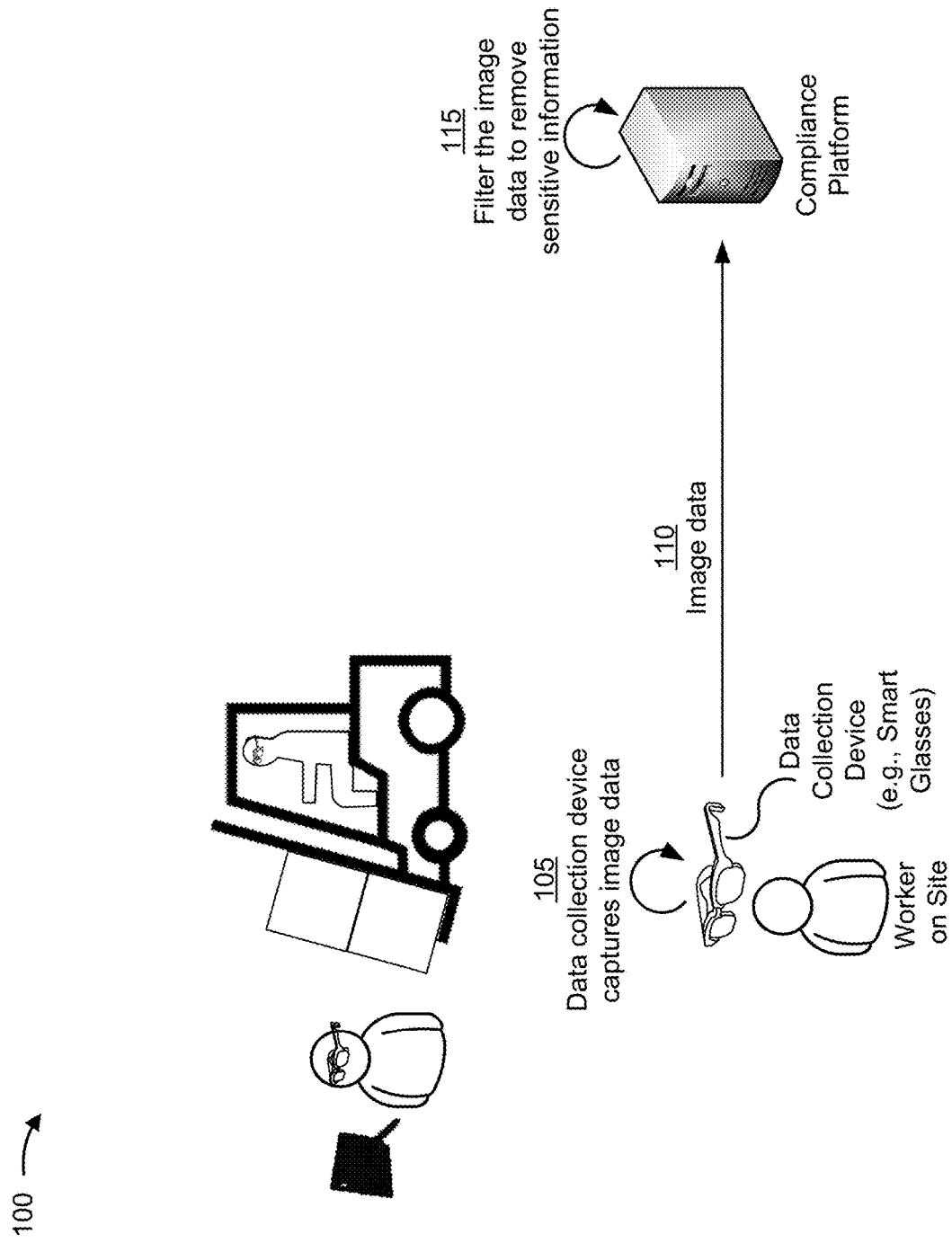

VERIFICATION OF PROOF OF WORK USING COMPUTER VISION AND/OR MACHINE LEARNING

BACKGROUND

Proof of work data may be used to verify that a service (e.g., a job, a task, and/or the like) has been completed (or partially completed). In some cases, proof of work data may deter a recipient of the service (e.g., an individual, an organization, and/or the like) from denying that the service has been completed (or partially completed).

SUMMARY

According to some implementations, a method may include receiving image data associated with an environment of an individual, wherein the image data is received from a wearable device associated with the individual. The method may include identifying verifiable content by using one or more content recognition techniques to process the image data, wherein the verifiable content includes at least one of: user data that depicts at least a portion of the individual; environment data that depicts at least a portion of the environment, or time data that indicates one or more times at which the image data was captured. The method may include determining, by processing the verifiable content, a likelihood that the individual is a particular employee or a particular agent of an organization. The method may include determining, by processing the verifiable content, one or more likelihoods of the environment captured by the image data being a work environment. The method may include determining, based on the likelihood and the one or more likelihoods, a number of verifiable hours worked by the individual during a given time period. The method may include identifying wages data that specifies a number of hours worked that has been credited to the individual for the given time period. The method may include determining, based on the number of verifiable hours worked by the individual and the number of hours worked that has been credited to the individual, whether an amount of wages paid to the individual is an incorrect amount of wages. The method may include performing one or more actions based on determining that the amount of wages paid to the individual is the incorrect amount of wages.

According to some implementations, a device may include one or more memories, and one or more processors, operatively coupled to the one or more memories, configured to receive image data associated with an environment of an individual. The one or more processors may identify verifiable content by using one or more content recognition techniques to process the image data, wherein the verifiable content includes at least one of: user data that depicts at least a portion of the individual, environment data that depicts at least a portion of the environment, or time data that indicates one or more times at which the image data was captured. The one or more processors may determine, based on a machine-learning-driven analysis of the verifiable content, a set of likelihoods of the individual being present at a work environment during particular hours of a given time period. The one or more processors may determine, based on the set of likelihoods, a number of verifiable hours worked by the individual during the given time period. The one or more processors may identify wages data that specifies a number of hours worked that has been credited to the individual for the given time period. The one or more processors may determine, based on the number of verifiable hours worked by the individual and the number of hours worked that has been credited to the individual, that an amount of wages paid to the individual is an incorrect amount of wages. The one or more processors may provide an alert to another device that indicates that the amount of wages paid to the individual is the incorrect amount of wages.

According to some implementations, a non-transitory computer-readable medium may store one or more instructions that, when executed by one or more processors of a device, may cause the one or more processors to receive image data associated with an environment of an individual. The one or more instructions may cause the one or more processors to filter the image data to remove sensitive information. The one or more instructions may cause the one or more processors to identify, by processing filtered image data, verifiable content associated with the filtered image data, wherein the verifiable content includes: environment data that depicts at least a portion of the environment of the individual, and time data that indicates one or more times at which the image data was captured. The one or more instructions may cause the one or more processors to determine, by processing the verifiable content, a set of likelihoods of the individual being present at a work environment during particular hours of a given time period. The one or more instructions may cause the one or more processors to determine, based on the set of likelihoods, a number of verifiable hours worked by the individual during the given time period. The one or more instructions may cause the one or more processors to identify wages data that specifies a number of hours worked that has been credited to the individual for the given time period. The one or more instructions may cause the one or more processors to determine, based on the number of verifiable hours worked by the individual and the number of hours worked that has been credited to the individual, that an amount of wages paid to the individual is an incorrect amount of wages. The one or more instructions may cause the one or more processors to provide an alert to another device that indicates that the amount of wages paid to the individual is the incorrect amount of wages.

BRIEF DESCRIPTION OF THE DRAWINGS

FIGS. 1A-1C are diagrams of one or more example implementations described herein.

DETAILED DESCRIPTION

Figure 1B:
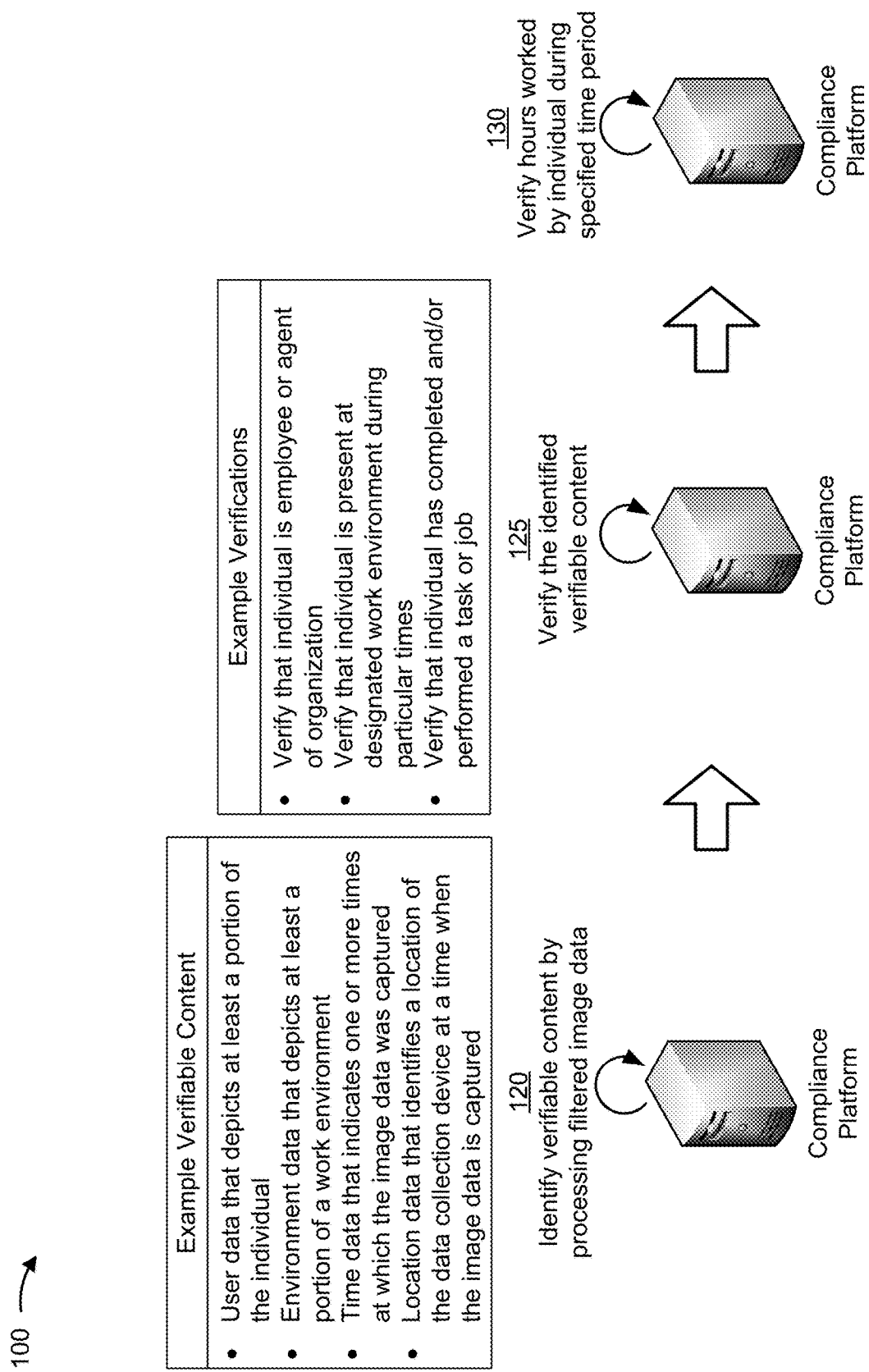

The following detailed description of example implementations refers to the accompanying drawings. The same reference numbers in different drawings may identify the same or similar elements.

Proof of work data may be used to verify that a service (e.g., a job, a task, and/or the like) has been completed (or partially completed). In some cases, time on site may be used as a proxy for hours worked. For example, an employee of an organization may clock in at a site at the start of a shift, may clock out at the site at the end of the shift, and may receive payment based on a total number (i.e., quantity) of hours that the employee was on site.

However, time on site is not an accurate way to measure the number of hours worked. For example, in some cases, the organization may overcompensate the employee if the employee was not working for the entire shift. In other cases, the organization may undercompensate the employee for the hours worked during the shift. For example, the organization may employ subjective tracking methods that may be used to adjust a number of hours worked by the employee. Without an efficient and/or effective way to track proof of work, devices of the organization may waste resources (e.g., processing resources, network resources, memory resources, and/or the like) by generating inaccurate records of proof of work, waste resources processing challenges to funds paid out to employees (e.g., by employees who believe that an inaccurate compensation was provided), waste human resources by failing to provide the employee with proper incentives to work efficiently (e.g., an employee may take an extra-long break if there is no system in place to verify the duration of the break taken), and/or the like.

Some implementations described herein provide a compliance platform to use computer vision and/or machine learning to verify proof of work. For example, an individual may use a wearable device (e.g., a smart device, and/or another type of device) while working in a designated work environment, and the wearable device may be used to periodically capture image data associated with an environment of the individual. The image data may be provided to the compliance platform. In this case, the compliance platform may process the image data using computer vision and/or machine learning to identify verifiable content that includes user data that depicts at least a portion of the individual, environment data that depicts at least a portion of the environment, time data that indicates one or more times at which the image data was captured, and/or the like.

Additionally, the compliance platform may process the verifiable content to determine, at particular times while the individual is working, a likelihood that the individual is a particular employee and/or a particular agent of an organization, and one or more likelihoods of the environment captured by the image data being a work environment. In this case, the compliance platform may determine, based on the first and second set of likelihoods, a number of verifiable hours worked by the individual during the shift. Furthermore, the compliance platform may identify wages data that specifies a number of hours worked that has been credited to the individual for the shift. In this case, the compliance platform may determine, based on the number of verifiable hours worked by the individual and the number of hours worked that has been credited to the individual, that an amount of wages paid to the individual is an incorrect amount of wages. This may allow the compliance platform to alert the individual that the amount of wages paid is an incorrect amount of wages, to cause an account of the individual to be updated with a correct amount of wages, and/or the like.

In this way, the compliance platform uses computer vision and/or machine learning to efficiently and/or effectively verify proof of work completed by the individual. For example, by using computer vision and/or machine learning to identify the verifiable content, the compliance platform is able to determine a verifiable number of hours worked by the individual, thereby conserving resources that an inferior solution might use to subjectively determine a number of hours for which to pay the individual, conserving resources of one or more devices of the organization that may be used by the individual to challenge the number of hours for which the individual was paid, and/or the like. Furthermore, by implementing a system for tracking proof of work, the compliance platform deters the individual from losing focus and failing to complete a service (e.g., a task, a job, and/or the like). This improves overall efficiency of the individual while completing the service, thereby conserving resources of one or more devices used to complete the service (e.g., relative to inefficiently completing the service, such as would be the case if the compliance platform was unavailable).

Figure 1C:
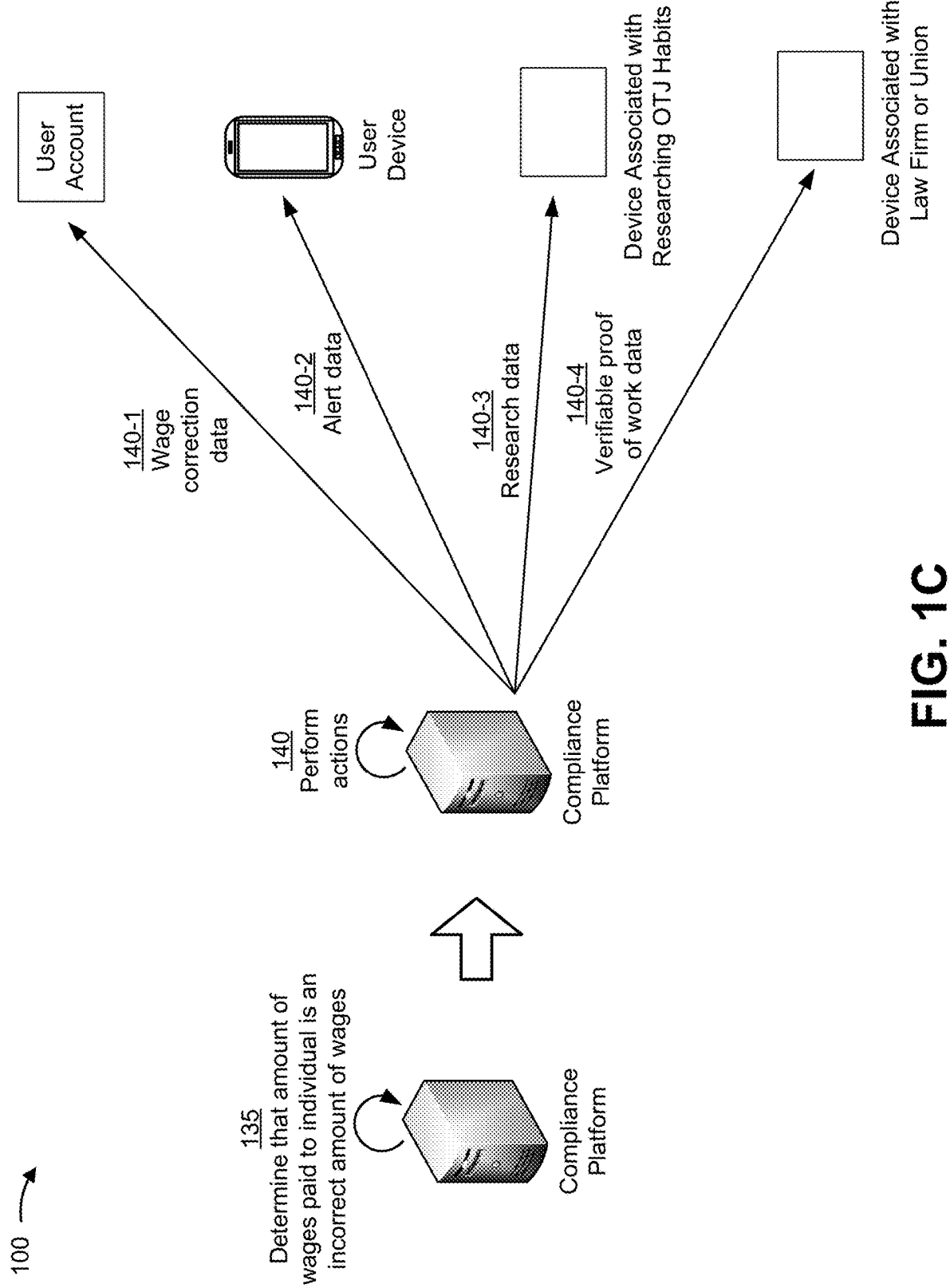

FIGS. 1A-1C are diagrams of one or more example implementations 100 described herein. For example, example implementation(s) 100 may include a data collection device, a compliance platform, a user device associated with an individual, a device associated with an account of the individual, a device associated with researching on the job (OTJ) habits of individuals, a device associated with a law firm or union, and/or the like. As shown in FIGS. 1A-1C, an individual may use the wearable device to generate image data while working a shift at a designated work environment associated with an organization, and the compliance platform may process the image data using computer vision and/or machine learning to verify proof of work completed by the individual. The data collection device may be a wearable device, a smart device (e.g., shown as smart glasses), an internet of things (IoT) device, a device affixed to an object in a work environment of the individual, and/or a similar type of device.

As shown in FIG. 1A, and by reference number 105, the data collection device may capture image data. For example, the individual may be on site for a shift and the data collection device may be used to capture image data associated with an environment of the individual. The image data may include verifiable content (defined further herein) that may be used to verify that the individual is an employee or agent of the organization, that may be used to verify that the individual is in a designated work environment (e.g., during a given time period, such as a duration of the individual's shift), that may be used to verify that the individual has completed and/or is performing a particular service (e.g., a task, a job, and/or the like) within the given time period (e.g., which may make the individual eligible for compensation bonuses), and/or the like. The image data may include one or more images captured by the data collection data, one or more frames of video recorded by the data collection device, and/or the like.

In some implementations, the data collection device may be configured with (or have access to) an application that may be used to capture image data. For example, the data collection device may be configured with (or have access to) an application that interacts with a camera component of the data collection device to capture image data, that provides and/or receives image data from the compliance platform (as described further herein), and/or the like. The application may be a mobile application, a web application, an IoT application, an applet, and/or the like.

In some implementations, the data collection device may use the camera component to capture the image data. For example, the data collection device may capture image data periodically while the individual is working (e.g., at designated time periods, at random time periods, and/or the like). In the example shown, the data collection device may be smart glasses and may use a camera affixed to the smart glasses to capture the image data.

Additionally, or alternatively, the data collection device may capture audio data. For example, while the individual is working, a microphone component of the data collection device may be used to record sound in a vicinity of the individual (e.g., at designated time periods, randomly, and/or the like). This is because in some cases, the audio data may include verifiable content (defined further herein) that may be used as proof of work completed by the individual. To provide a few examples, the data collection device may capture audio data of a voice-activated login and/or logout made by the individual (e.g., which may serve as proof that the user logged in and/or logged out), may capture audio data of a conversation that the individual has during the shift (e.g., which may be further processed to verify proof of work completed), and/or the like.

As shown by reference number 110, the data collection device may provide the image data to the compliance platform. For example, the data collection device may provide the image data to the compliance platform using an application programming interface (API) and/or using another type of communication interface. In some implementations, the data collection device may provide the image data to the compliance platform after each time that the image data is captured, may provide the image data at designated time periods, may provide the image data in batch form (e.g., in some cases, the data collection device may be unable to connect to a network while the individual is on site), and/or the like.

As shown by reference number 115, the compliance platform may filter the image data to remove sensitive information. For example, the compliance platform may filter the image data to identify a set of pixels within the image data that represent sensitive information and may modify the set of pixels in a manner that removes and/or obscures the sensitive information. In this case, the compliance platform may identify the sensitive information using one or more content recognition techniques and/or a first data model that has been trained using machine learning, and may remove and/or obscure the sensitive information using one or more filtering techniques, as will be further discussed below. The sensitive information may include image data identifying a particular individual who has not consented to being recorded, audio data of the particular individual, image data and/or text data identifying and/or describing personal information of the particular individual (e.g., which may be displayed on an interface of a device that is being used in the work environment, such as a desktop computer or a similar type of device), and/or the like.

In some implementations, the compliance platform may identify sensitive information in the image data using one or more content recognition techniques. The one or more content recognition techniques may be part of a set of content recognition techniques that are used to identify sensitive information, used to identify verifiable content as described in connection with reference number 125, and/or the like. The set of content recognition techniques may include one or more computer vision techniques (e.g., an image classification technique, an object detection technique, a semantic segmentation technique, an OCR technique, and/or the like), one or more machine learning techniques (e.g., a regression technique, a clustering technique, a technique using a neural network, and/or the like), and/or the like.

As an example, the compliance platform may receive image data depicting a user interface display (e.g., a computer screen) of a user device that the individual was looking at while working. In this case, the compliance platform may use an optical character recognition (OCR) technique to scan the image data and to generate text data describing text displayed on the user interface. Additionally, the compliance platform may use a text recognition technique to determine that a subset of the text includes sensitive information. For example, the text may include address information listed on an order made by a client of the organization. In this example, the compliance platform may process the text using one or more rules that are part of the text recognition technique (e.g., such as a rule that describes one or more properties of address information) to identify the address information as sensitive information. This may allow the compliance platform to modify the image data to remove or obscure the sensitive information from the image data. For example, the compliance platform may remove the sensitive information from the image data by changing black pixels that are part of the sensitive information to white pixels, may obscure the sensitive information by redacting the sensitive information from the image data, and/or the like.

Additionally, or alternatively, the compliance platform may identify the sensitive information in the image data using the first data model. For example, the compliance platform may train a first data model to receive image data as an input and to output a set of scores that indicate likelihoods of particular pixels or clusters of pixels representing sensitive information.

In some implementations, before training the first data model, the compliance platform may receive historical image data that depicts one or more work environments associated with the organization. In this case, the compliance platform may perform a set of feature identification techniques to process the historical image data to determine a set of features that may be used to train the first data model. The set of feature identification techniques may include a technique that involves text mining and latent semantic analysis (LSA), a trend variable analysis technique, an interest diversity analysis technique, a technique using a neural network, a composite indicators analysis technique, a clustering technique, a regression technique, and/or the like.

The set of features may include values (e.g., pixel values, numerical values, character values, and/or the like) that serve as indicators of whether particular information is sensitive information. For example, if a customer address is included on a customer order, is visible on a computer screen, and is captured by the data collection device, then the compliance platform may process the image data depicting the customer order and may determine that a collection of characters that form an address is a feature that is indicative of sensitive information. As a specific example, the collection of characters may be determined to be a feature indicative of sensitive information based on the collection of characters beginning with numbers (e.g., a street address), including street address language (e.g., Rd., Blvd., and/or the like), ending with numbers (e.g., a zip code), and/or the like.

In some implementations, the compliance platform may train the first data model. For example, the compliance platform may process the set of features using one or more machine learning techniques to train the first data model such that the first data model is able to receive particular features as input and is able to output scores that indicate likelihoods of the particular pixels or clusters of pixels representing sensitive information. The one or more machine learning techniques may include a classification-based technique, a regression-based technique, a clustering-based technique, a technique using a neural network, and/or the like.

As an example, the compliance platform may train a neural network based on the set of features. For example, the compliance platform may train a neural network that has an input layer, one or more intermediate layers (e.g., a fully connected layer, a convolutional layer, a pooling layer, a recurrent layer, and/or the like), and an output layer. The set of features may be hyperparameters that are used as part of a cost function of the neural network. In this case, the platform may perform a feedforward technique to provide particular image data (e.g., that is part of a test dataset) as input to the neural network, and the neural network may output one or more scores that indicate likelihoods of particular data (e.g., particular pixels of the image data, particular characters that were identified using a text detection technique such as OCR, and/or the like) being sensitive information.

Additionally, the compliance platform may compare the one or more scores to known values and may determine an error value based on the comparison between the one or more scores and the known values. The error value may be used to update the cost function (e.g., which may assign weights to particular features of the set of features), and the compliance platform may perform a backpropagation technique to iteratively train the neural network until a threshold level of accuracy has been reached. After using the first data model to identify the sensitive information, the compliance platform may remove and/or obscure the sensitive information in a manner such as described above.

In some implementations, the compliance platform may receive a trained data model. For example, the data model may be trained by another device and may be provided to the compliance platform, made accessible to the compliance platform (e.g., via an API or another type of communication interface), and/or the like.

Additionally, or alternatively, the data collection device may filter the image data to remove the sensitive information (e.g., instead of the compliance platform and/or in addition to the compliance platform). For example, the data collection device may filter the image data to remove the sensitive information using one or more techniques described as being performed by the compliance platform. By filtering the image data with the data collection device, security and data privacy is improved relative to filtering the image data with the compliance platform (e.g., because the data collection device may be able to remove the sensitive information without connecting to a network and thus making the image data more susceptible to unauthorized use).

In this way, the compliance platform receives image data associated with the environment of the individual and filters the image data to remove sensitive information.

As shown in FIG. 1B, and by reference number 120, the compliance platform may identify verifiable content by processing filtered image data. For example, the compliance platform may process filtered image data to identify verifiable content that may be used to verify that the individual is an employee or agent of the organization, that may be used to verify that the individual is in a designated work environment (e.g., during a given time period, such as a duration of the individual's shift), that may be used to verify that the individual has completed and/or is performing a particular service within the given time period (e.g., which may make the individual eligible for compensation bonuses), and/or the like. In this case, the compliance platform may identify the verifiable content by using one or more of the set of content recognition techniques (e.g., as defined above) to process the filtered image data.

The verifiable content may include user data that depicts at least a portion of the individual (and/or depicts an identifier of the individual), environment data that depicts at least a portion of the environment, time data that indicates one or more times at which the image data was captured, and/or the like. The user data may include characteristics data that identifies a set of characteristics of the individual (e.g., a height of the individual, a characteristic of a face of the individual, a gesture made by the individual, an emotion exhibited by the individual, and/or the like), an identifier of the individual (e.g., a nametag, an employee ID, and/or the like), and/or the like. The environment data may include data identifying a particular user device that is present in the designated work environment, data identifying content displayed on a screen of the particular user device, data identifying a piece of equipment, data identifying a product, location data that identifies a location of the data collection device at a time when the image data was captured, and/or any other data that may serve as an indicator that the image data is depicting the work environment. The time data may include a time stamp that indicates a time at which the image data was captured.

In some implementations, the compliance platform may identify, as verifiable content, user data depicting at least a portion of the individual. For example, to be able to verify that an individual is an employee or an agent of the organization, the compliance platform may have to first identify user data (e.g., within an image) that depicts at least a portion of an individual. In this case, the compliance platform may use one or more computer vision techniques (e.g., a facial recognition technique, a technique capable of identifying a height of an individual, and/or the like) to process the image data to identify the user data. The user data may depict a set of characteristics of the individual. The set of characteristics may include a height of an individual, one or more characteristics associated with a face of the individual (e.g., a size of one or more body parts of the individual, such as a nose, a mouth, and/or the like), and/or the like. This may allow the compliance platform to verify that the individual is an employee or an agent of the organization, as will be described further herein.

Additionally, or alternatively, the compliance platform may process the image data to identify, as verifiable content, environment data of the individual. For example, to verify that the individual was present in the work environment at a given time period, the compliance platform may identify environment data that depicts at least a portion of an environment captured by the data collection data. In this case, the compliance platform may use one or more object recognition techniques to process the image data to identify the environment data (e.g., which may depict the environment captured by the data collection device). The environment data may include pixels that identify objects that are commonly found in a work environment at which the individual is scheduled to be working (e.g., equipment, work product, products sold by the organization, and/or the like), objects that are not found in the work environment (e.g., which may be indicative of the individual being outside of the work environment), and/or the like. This may allow the compliance platform to compare the identified environment data with work environment data of the work environment to verify that the individual was present in the work environment during the given time period, as will be described further herein.

Additionally, or alternatively, the compliance platform may identify, as verifiable content, time data and/or location data. For example, the compliance platform may process image metadata to identify a time at which the image data was captured, a location (e.g., a set of geographic coordinates) of the data collection device at the time at which the image data was captured, and/or the like. The time data and/or the location data may be used to verify that the individual was present in the work environment at one or more times throughout the given time period (e.g., at times throughout the scheduled shift).

Additionally, or alternatively, the compliance platform may identify, as verifiable content, user activity data associated with an action performed by the individual. For example, in some cases, the individual may be eligible for one or more commissions or bonuses based on completion of an action performed by the individual, such as completion of a service, and/or the like. In other cases, the action performed by the individual may serve as proof that the individual was present in the work environment, performing a required service, and/or the like. To be able to verify that the individual performed the action, the compliance platform may process the image data using one or more content recognition techniques to identify the user activity data.

As a specific example, the individual may be working on a computer and wearing smart glasses. In this example, the image data may depict one or more user interface displays (e.g., which may present text serving as proof of a completed service), may depict the individual's arm and/or hand movements as the individual is typing and/or interacting with the computer, and/or the like. As a counter example, the image data may depict that the individual is visiting websites unrelated to work, is holding a cup of coffee for the first hour of every day and not typing and producing work product, and/or the like. This may allow the compliance platform to verify the action performed by the individual, as further described below.

Additionally, or alternatively, the compliance platform may use a second data model that has been trained using machine learning to identify verifiable content. For example, the compliance platform may use one or more machine learning techniques to train a second data model, such that the second data model may receive image data as an input and may output a set of scores that indicate likelihoods of particular pixels being part of verifiable content. Additional information regarding training the second data model may be performed in a manner consistent with that described in connection with training the first data model. For example, the second data model may be trained using one or more machine learning techniques and a set of features that include values (e.g., pixel values, numerical values, character values, and/or the like) that serve as indicators of whether verifiable content is present within the image data.

As an example, the second data model may be trained to identify user action data, such as by being trained to identify a service or action that is specific to a role performed by the individual within the organization, such as an individual interacting with a particular device (e.g., a phone, a computer, and/or the like), performing a task relating to manual labor, attending a company meeting, and/or the like.

In some implementations, the compliance platform may identify verifiable content in an order that is based on a set of priority rules. For example, the compliance platform may be configured with a set of priority rules that allow the compliance platform to efficiently identify the verifiable content within the image data. The set of priority rules may include one or more priority rules that indicate to identify particular types of verifiable content before identifying one or more other types of verifiable content.

As an example, identifying that the user is an employee or agent of the organization may expend less resources (e.g., processing resources, network resources, and/or the like) than identifying the environment depicted by the image data.

In this example, the compliance platform may be configured with a priority rule that permits the compliance platform to first identify whether the image data includes user data that depicts at least a portion of the individual. If the image data does not include the user data, the compliance platform may stop identifying verifiable content and notify the user that the image data is insufficient for uses relating to proof of work completed. In this way, the compliance platform conserves resources relative to executing all (or some) content recognition techniques, relative to executing particular content recognition techniques in an inefficient order, and/or the like.

In some implementations, the verifiable content may be identified by another device, such as the data collection device. For example, the data collection device may have an application or may have access to an application that is capable of identifying verifiable content in a manner described as being identified by the compliance platform.

As shown by reference number 125 in FIG. 1B, the compliance platform may verify the identified verifiable content. For example, the compliance platform may process the identified verifiable content to verify that the individual is an employee or agent of the organization, to verify that the individual is in a designated work environment (e.g., during a given time period, such as a duration of the individual's shift), to verify that the individual has completed and/or is performing a particular service within the given time period, and/or the like.

In some implementations, the compliance platform may verify that the individual is an employee or agent of the organization. For example, the compliance platform may compare a set of characteristics of the individual (e.g., which may be identified by the user data) and sets of configured characteristics of employees and/or agents of the organization. In this case, the compliance platform may determine a likelihood that the individual is an employee or an agent of the organization based on the comparison. Additionally, the compliance platform may verify that the individual is the employee or agent of the organization based on the likelihood. For example, the compliance platform may compare the likelihood that the individual is the employee or agent of the organization and a threshold likelihood and may verify that the individual is the employee or agent based on the likelihood satisfying the threshold likelihood.

Additionally, or alternatively, the compliance platform may verify that the individual is in a designated work environment at one or more times during the given time period. For example, to verify that the individual is in the designated work environment at a particular time during the individual's shift, the compliance platform may first determine that the time at which the image data was captured is during a designated working time and may verify whether the environment data is part of the designated work environment. To do this, the compliance platform may compare the identified environment data and work environment data depicting the work environment. In this case, the compliance platform may determine one or more likelihoods of the individual being present at the work environment during the particular time based on determining that the time at which the image data was captured is during the individual's shift and based on comparing the identified environment data and the work environment data. For example, multiple objects (e.g., equipment in the work environment, products for sale, and/or the like) may have been identified as environment data, and the compliance platform may, for each object, determine a likelihood of the object being part of the designated work environment (e.g., by comparing image data of an object to stored image data of objects found in the designated work environment). The compliance platform may verify that the individual is in the designated work environment at the particular time based on the one or more likelihoods. For example, the compliance platform may compare the one or more likelihoods and one or more threshold likelihoods and may verify that the individual is in the designated work environment based on the one or more likelihoods satisfying the one or more threshold likelihoods.

Additionally, or alternatively, the compliance platform may also verify that the individual is in the designated work environment using location data. For example, the compliance platform may compare location data that indicates a geographic location at which the data collection device captured the environment data with other location data that indicates a geographic area of the designated work environment. In this case, the compliance platform may verify that the individual is in the designated work environment based on the geographic location being located within the geographic area of the designated work environment, based on the geographic location being within a threshold distance of the geographic area of the designated work environment, and/or the like.

Additionally, or alternatively, the compliance platform may verify that the individual has completed (and/or has performed) a particular service within a specified time period. For example, the individual may have a contract that provides the individual with commissions, bonuses, additional compensation, and/or the like, based on the individual completing a task, based on the individual completing the service within a specified time period, and/or the like. To verify that the individual has completed the service (e.g., within the specified time period), the compliance platform may first determine that the time at which the image data was captured is during the scheduled shift, is within a configured time deadline set for the task or job, and/or the like.

Next, the compliance platform may compare the identified user activity data and configured task completion data that serves as evidence of a completed service. In this case, the compliance platform may determine one or more likelihoods of the service being completed based on determining that the time at which the image data was captured is within the specified time period and based on comparing the identified user activity data and the configured task completion data. Additionally, the compliance platform may verify that the individual has completed the service within the specified time period based on the one or more likelihoods. For example, the compliance platform may compare the one or more likelihoods and one or more threshold likelihoods and may verify that the has completed the service within the specified time period based on the one or more likelihoods satisfying the one or more threshold likelihoods.

Additionally, or alternatively, the compliance platform may determine a verifiable number of services that have been completed. For example, the compliance platform may determine a verifiable number of services that have been completed based on whether the user activity data has been successfully verified.

As shown by reference number 130, the compliance platform may verify a number of hours worked by the individual during a specified time period. For example, the compliance platform may verify the number of hours worked by the individual based on whether the verifiable content has been successfully verified. An hour of work may be said to be verified based on whether a set of verification criteria has been satisfied. For example, the set of verification criteria may specify that an hour of work may be verified, for a first time (e.g., a start of the hour) and for a second time (e.g., an end of the hour), if the individual has been verified to be an employee or agent of the organization, if the individual is present at the designated work environment, if the individual has completed and/or performed a service, and/or the like.

In some implementations, the compliance platform may generate and/or store metadata identifying and/or describing the verifiable content, metadata indicating whether particular verifiable content has been successfully verified, metadata specifying the verifiable number of hours worked and/or the verifiable number of services completed, and/or the like. For example, the compliance platform may generate and/or store the metadata described above in association with an identifier of the individual, an identifier of the organization, an identifier of a role that the individual has with the organization, wages data that specifies a number of hours worked that has been credited to the individual and/or an amount of wages paid out to the individual, and/or the like. In some cases, the metadata may be stored using a secure data structure, such as a blockchain or another type of secure data structure. This may allow the metadata to be referenced as proof of work completed by the individual (e.g., proof of hours worked, proof of tasks completed, and/or the like), to be referenced to provide insight into behaviors of employees and/or agents of the organization, to be referenced when an employment dispute is impending, and/or the like, as described further herein.

In this way, the compliance platform identifies verifiable content and verifies the content such that the verified content may be used as proof of work completed by the individual.

As shown in FIG. 1C, and by reference number 135, the compliance platform may determine that an amount of wages paid to the individual is an incorrect amount of wages. For example, the compliance platform may determine that the amount of wages paid to the individual is an incorrect amount of wages based on the number of verifiable hours worked by the individual and wages data that specifies a number of hours worked that has been credited to the individual (e.g., for the given time period), as further described below.

In some implementations, the compliance platform may obtain and/or identify wages data that specifies a number of hours worked that has been credited to the individual for the given time period. For example, the compliance platform may obtain the wages data by using an application programming interface or another type of secure communication interface to interact with a bank server to obtain the wages data. In other cases, the bank server (or another device) may be configured to automatically provide the compliance platform with the wages data (e.g., periodically over a time interval, such as over each pay cycle).

In some implementations, the compliance platform may determine that the amount of wages paid to the individual is an incorrect amount of wages. For example, the compliance platform may determine the amount of wages paid to the individual (e.g., as specified in the wages data) and may determine a correct amount of wages based on the number of verifiable hours worked by the individual and a pay rate of the individual (e.g., an hourly rate, and/or the like). In this case, the compliance platform may compare the amount of wages paid to the individual and the correct amount of wages and may determine that the amount of wages paid to the individual is the incorrect amount of wages based on the comparison.

In some implementations, the compliance platform may prevent distribution of an incorrect amount of wages. For example, the compliance platform may have access to wages data that specifies an amount of wages that are to be distributed to the individual. In this case, the compliance platform may determine the amount of wages that are to be distributed to the individual and may determine a correct amount of wages to distribute based on the number of verifiable hours worked by the individual and a pay rate of the individual. Additionally, the compliance platform may compare the amount of wages that are to be distributed to the individual and the correct amount of wages to distribute and may determine that the amount of wages that are to be distributed is an incorrect amount of wages. This may allow the compliance platform to perform one or more actions to prevent distribution of the incorrect amount of wages (e.g., by interacting with an accounting device of the organization to correct the amount of wages to distribute to the individual, and/or the like). In this way, the compliance platform conserves resources that would otherwise be wasted to update an account of the individual with an incorrect amount of wages, resources that would otherwise be wasted to process a wages dispute made by the individual after seeing that the incorrect amount of wages has been distributed, and/or the like.

As shown by reference number 140, the compliance platform may perform one or more actions based on determining that the amount of wages paid to the individual is the incorrect amount of wages. For example, and as shown by reference number 140-1, the compliance platform may cause wage correction data (e.g., which reflects a correct amount of wages) to be provided to an account of the individual. In this case, the compliance platform may, using an API or another type of communication interface, provide a set of instructions to a device associated with an accounting department of the organization to cause the device to provide the user with the correct amount of wages (e.g., by transferring wages from an account associated with the organization to an account of the individual).

Additionally, or alternatively, and as shown by reference number 140-2, the compliance platform may provide an alert to the user device (e.g., a device accessible to the individual) to alert the individual that the wages paid were the incorrect amount of wages. Additionally, or alternatively, and as shown by reference number 140-3, the compliance platform may provide research data to the device associated with researching on the job (OTJ) habits of individuals. For example, the compliance platform may provide research data (e.g., the stored metadata described elsewhere herein) to the device via an API or another type of communication interface. This may allow the device to use the research data to identify actionable insights into the work environment, determine key performance indicators (KPIs) associated with particular metadata, and/or the like.

Additionally, or alternatively, and as shown by reference number 140-4, the compliance platform may provide verifiable proof of work data to a device associated with a law firm or union. For example, the metadata described elsewhere herein may be securely stored and used as verifiable proof of work completed by the individual (e.g., and/or as verifiable proof that work was not completed by the individual). In some implementations, the compliance platform may provide a mechanism for a person to audit the results (e.g., the proof of work data), such as by providing a user interface to access video footage, input data, machine learning output, and/or other information described herein.

In this way, the compliance platform uses computer vision and/or machine learning to efficiently and/or effectively verify proof of work completed by the individual. For example, by using computer vision and/or machine learning to identify the verifiable content, the compliance platform is able to determine a verifiable number of hours worked by the individual, thereby conserving resources that an inferior solution might use to subjectively determine a number of hours to pay to the individual, conserving resources of one or more devices of the organization that may be used by the individual to challenge the number of hours paid out to the individual, and/or the like.

As indicated above, FIGS. 1A-1C are provided as one or more examples. Other examples may differ from what is described with regard to FIGS. 1A-1C. For example, there may be additional devices and/or networks, fewer devices and/or networks, different devices and/or networks, or differently arranged devices and/or networks than those shown in FIGS. 1A-1C. Furthermore, two or more devices shown in FIGS. 1A-1C may be implemented within a single device, or a single device shown in FIGS. 1A-1C may be implemented as multiple and/or distributed devices. Additionally, or alternatively, a set of devices (e.g., one or more devices) included in the one or more example implementations 100 may perform one or more functions described as being performed by another set of devices included in the one or more example implementations 100.

Figure 2:
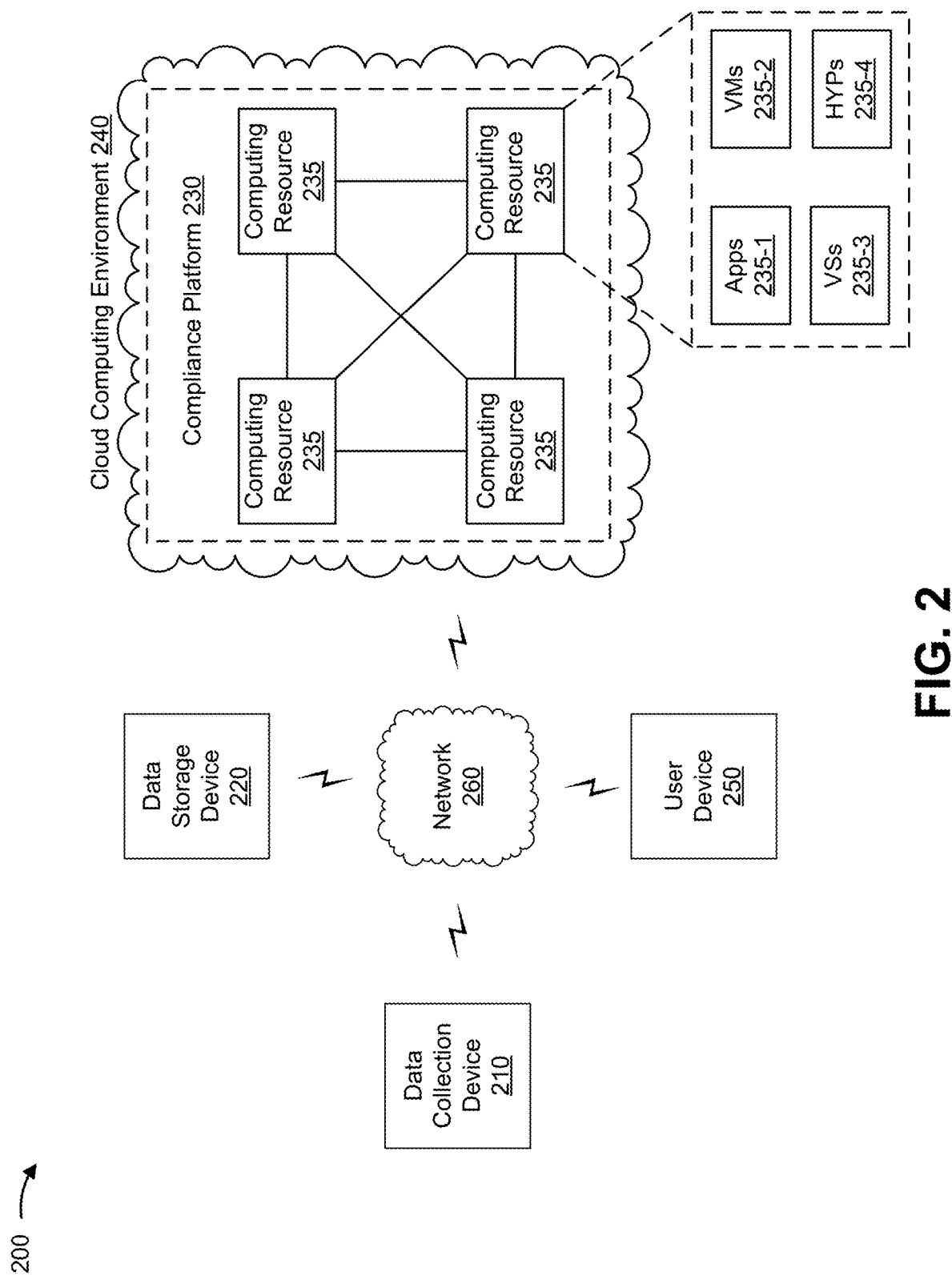
FIG. 2 is a diagram of an example environment in which systems and/or methods described herein may be implemented.

FIG. 2 is a diagram of an example environment 200 in which systems and/or methods, described herein, may be implemented. As shown in FIG. 2, environment 200 may include a data collection device 210, a data storage device 220, a compliance platform 230 hosted within a cloud computing environment 240, a user device 250, and/or a network 260. Devices of environment 200 may interconnect via wired connections, wireless connections, or a combination of wired and wireless connections.

Data collection device 210 includes one or more devices capable of receiving, generating, storing, processing, determining, and/or providing image data associated with a work environment of an individual. For example, data collection device 210 may include a communication and/or computing device, such as a wearable communication device (e.g., a smart wristwatch, a pair of smart eyeglasses, smart clothing, and/or the like), an internet of things (IoT) device, a mobile phone (e.g., a smart phone, a radiotelephone, and/or the like), a laptop computer, a tablet computer, a handheld computer, a gaming device, or a similar type of device.

In some implementations, data collection device 210 may be configured with or have access to an application (e.g., an application local to data collection device 210, a web application, and/or the like) that is capable of capturing and/or providing image data to compliance platform 230. In some implementations, data collection device 210 may capture image data associated with a work environment of an individual. In some implementations, data collection device 210 may use an application programming interface (API) or another type of communication interface to provide compliance platform 230 with the image data. In some implementations, data collection device 210 may perform one or more functions or features that are described as being performed by compliance platform 230.

Data storage device 220 includes one or more devices capable of receiving, storing, generating, determining, and/or providing data associated with proof of work of an individual. For example, data storage device 220 may include a server device or a group of server devices. In some implementations, data storage device 220 may store image data associated with a work environment of an individual, filtered image data, verifiable content that has been identified within the image data and/or the filtered image data, other data that is generated and/or received by compliance platform 230 (e.g., alert data, research data, verifiable proof of work data, and/or the like, as each defined elsewhere herein), and/or the like. In some implementations, data storage device 220 may use an application programming interface (API) or another type of communication interface to provide stored data to compliance platform 230.

Compliance platform 230 includes one or more devices capable of receiving, storing, generating, determining, and/or providing information associated with proof of work of an individual. For example, compliance platform 230 may include a server device (e.g., a host server, a web server, an application server, etc.), a data center device, or a similar device. In some implementations, compliance platform 230 may be configured with or have access to one or more functions and/or features that enable compliance platform 230 to perform one or more processes described herein.

In some implementations, as shown, compliance platform 230 may be hosted in cloud computing environment 240. While implementations described herein describe compliance platform 230 as being hosted in cloud computing environment 240, in some implementations, compliance platform 230 might not be cloud-based (i.e., may be implemented outside of a cloud computing environment) or may be partially cloud-based.

Cloud computing environment 240 includes an environment that hosts compliance platform 230. Cloud computing environment 240 may provide computation, software, data access, storage, etc. services that do not require end-user knowledge of a physical location and configuration of system(s) and/or device(s) that hosts compliance platform 230. As shown, cloud computing environment 240 may include a group of computing resources 235 (referred to collectively as "computing resources 235" and individually as "computing resource 235").

Computing resource 235 includes one or more personal computers, workstation computers, server devices, or another type of computation and/or communication device. In some implementations, computing resource 235 may host compliance platform 230. The cloud resources may include compute instances executing in computing resource 235, storage devices provided in computing resource 235, data transfer devices provided by computing resource 235, and/or the like. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, and/or the like.

Application 235-1 may include one or more software applications that may be provided to or accessed by data collection device 210, data storage device 220, and/or user device 250. Application 235-1 may eliminate a need to install and execute the software applications on these devices. For example, application 235-1 may include software associated with compliance platform 230 and/or any other software capable of being provided via cloud computing environment 240. In some implementations, one application 235-1 may send/receive information to/from one or more other applications 235-1, via virtual machine 235-2.

Virtual machine 235-2 may include a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program and may support a single process. In some implementations, virtual machine 235-2 may execute on behalf of another device (e.g., data collection device 210, data storage device 220, and/or user device 250), and may manage infrastructure of cloud computing environment 240, such as data management, synchronization, or long-duration data transfers.

Virtualized storage 235-3 may include one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 may provide hardware virtualization techniques that allow multiple operating systems (e.g., "guest operating systems") to execute concurrently on a host computer, such as computing resource 235. Hypervisor 235-4 may present a virtual operating platform to the guest operating systems and may manage the execution of the guest operating systems. Multiple instances of a variety of operating systems may share virtualized hardware resources.

User device 250 includes one or more devices capable of receiving, generating, storing, processing, determining, and/or providing information associated with proof of work of an individual. For example, user device 250 may include a communication and/or computing device, such as a mobile phone (e.g., a smart phone, a radiotelephone, and/or the like), a laptop computer, a tablet computer, a handheld computer, a gaming device, a wearable communication device (e.g., a smart wristwatch, a pair of smart eyeglasses, smart clothing, and/or the like), or a similar type of device. In some implementations, user device 250 may receive, from compliance platform 230, alert data, research data, verifiable proof of work data, and/or the like. For example, user device 250 may receive an alert indicating that a wage discrepancy has been identified. As another example, user device 250 may receive research data relating to habits or patterns relating to work performed by one or more individuals. As another example, user device 250 may receive verifiable proof of work data that may be used as part of a law suit or a compliant that may be filed by a law firm or union.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
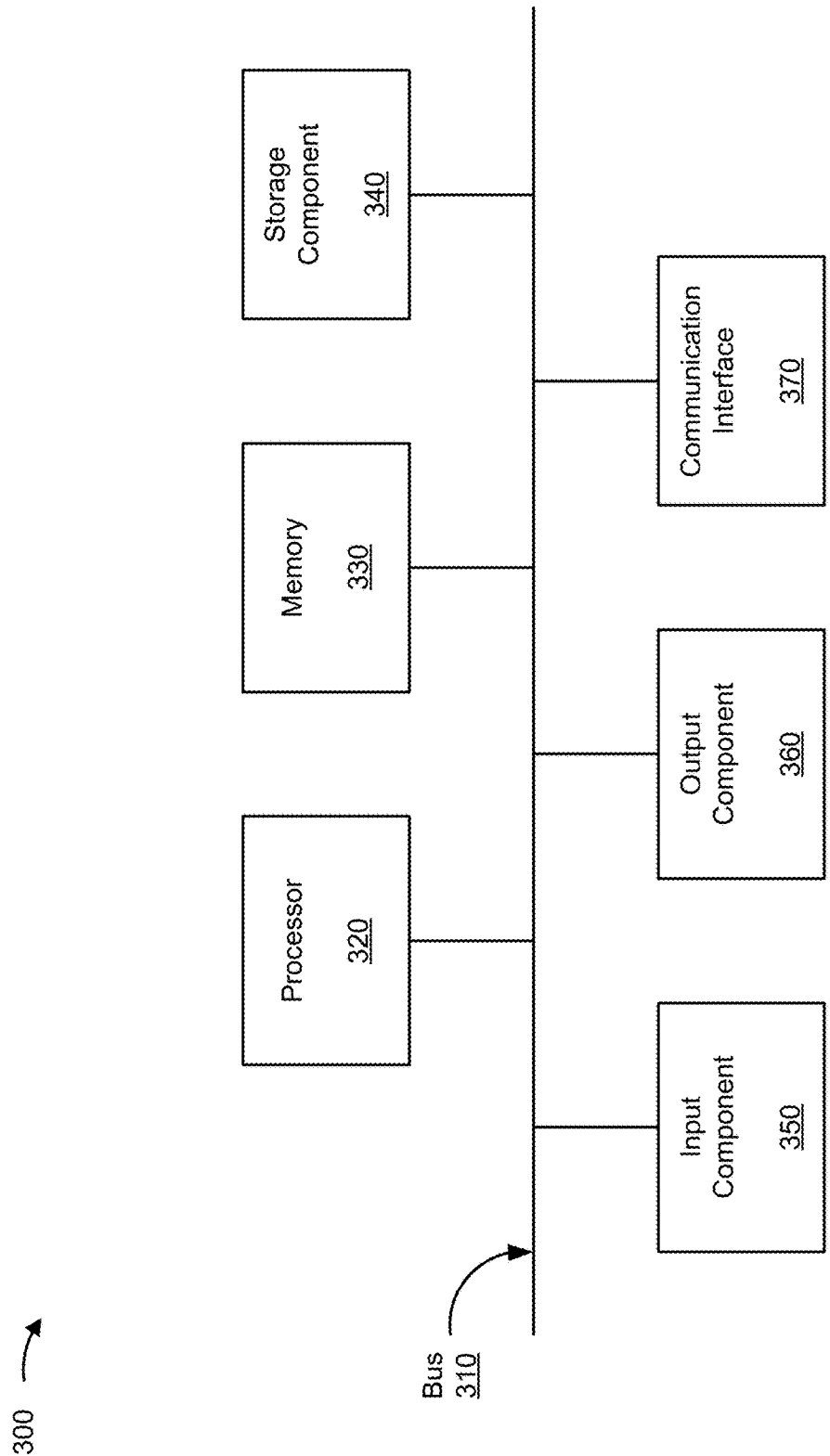
FIG. 3 is a diagram of example components of one or more devices of FIG. 2.

FIG. 3 is a diagram of example components of a device 300. Device 300 may correspond to data collection device 210, data storage device 220, compliance platform 230, and/or user device 250. In some implementations, data collection device 210, data storage device 220, compliance platform 230, and/or user device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
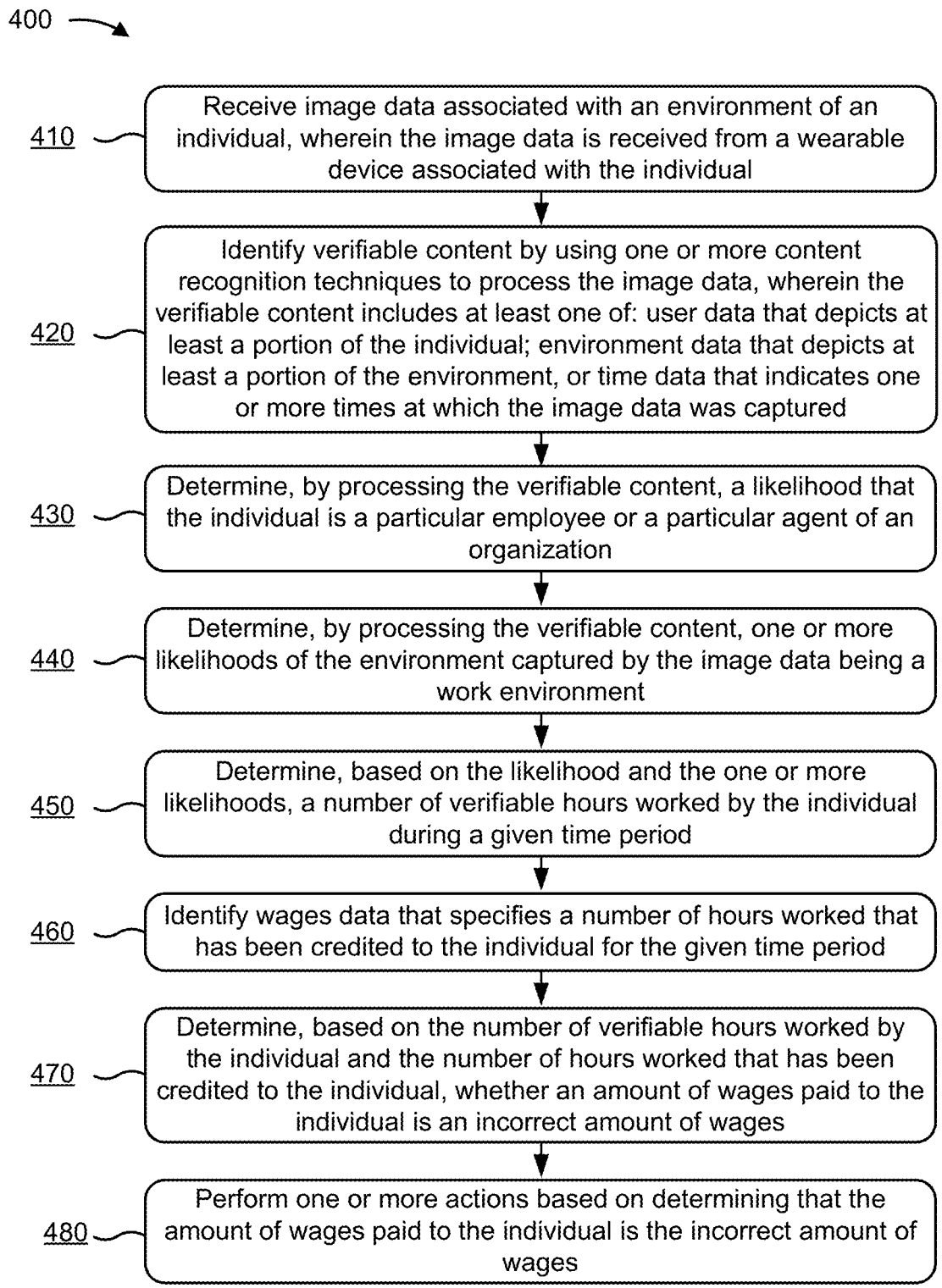
FIGS. 4-6 are flowcharts of one or more example processes for using computer vision and/or machine learning to verify proof of work.

FIG. 4 is a flow chart of an example process 400 for using computer vision and/or machine learning to verify proof of work. In some implementations, one or more process blocks of FIG. 4 may be performed by a compliance platform (e.g., compliance platform 230). In some implementations, one or more process blocks of FIG. 4 may be performed by another device or a group of devices separate from or including the compliance platform, such as a data collection device (e.g., data collection device 210), a data storage device (e.g., data storage device 220), a user device (e.g., user device 250), and/or the like.

As shown in FIG. 4, process 400 may include receiving image data associated with an environment of an individual, wherein the image data is received from a wearable device associated with the individual (block 410). For example, the compliance platform (e.g., using computing resource 225, processor 320, memory 330, storage component 340, input component 350, communication interface 370, and/or the like) may receive image data associated with an environment of an individual, as described above. In some implementations, the image data may be received from a wearable device associated with the individual.

As further shown in FIG. 4, process 400 may include identifying verifiable content by using one or more content recognition techniques to process the image data, wherein the verifiable content includes at least one of: user data that depicts at least a portion of the individual, environment data that depicts at least a portion of the environment, or time data that indicates one or more times at which the image data was captured (block 420). For example, the compliance platform (e.g., using computing resource 225, processor 320, memory 330, storage component 340, and/or the like) may identify verifiable content by using one or more content recognition techniques to process the image data, as described above. In some implementations, the verifiable content may include at least one of: user data that depicts at least a portion of the individual, environment data that depicts at least a portion of the environment, or time data that indicates one or more times at which the image data was captured.

As further shown in FIG. 4, process 400 may include determining, by processing the verifiable content, a likelihood that the individual is a particular employee or a particular agent of an organization (block 430). For example, the compliance platform (e.g., using computing resource 225, processor 320, memory 330, storage component 340, and/or the like) may determine, by processing the verifiable content, a likelihood that the individual is a particular employee or a particular agent of an organization, as described above.

As further shown in FIG. 4, process 400 may include determining, by processing the verifiable content, one or more likelihoods of the environment captured by the image data being a work environment (block 440). For example, the compliance platform (e.g., using computing resource 225, processor 320, memory 330, storage component 340, and/or the like) may determine, by processing the verifiable content, one or more likelihoods of the environment captured by the image data being a work environment, as described above.

As further shown in FIG. 4, process 400 may include determining, based on the likelihood and the one or more likelihoods, a number of verifiable hours worked by the individual during a given time period (block 450). For example, the compliance platform (e.g., using computing resource 225, processor 320, memory 330, storage component 340, and/or the like) may determine, based on the likelihood and the one or more likelihoods, a number of verifiable hours worked by the individual during a given time period, as described above.

As further shown in FIG. 4, process 400 may include identifying wages data that specifies a number of hours worked that has been credited to the individual for the given time period (block 460). For example, the compliance platform (e.g., using computing resource 225, processor 320, memory 330, storage component 340, and/or the like) may identify wages data that specifies a number of hours worked that has been credited to the individual for the given time period, as described above.

As further shown in FIG. 4, process 400 may include determining, based on the number of verifiable hours worked by the individual and the number of hours worked that has been credited to the individual, that an amount of wages paid to the individual is an incorrect amount of wages (block 470). For example, the compliance platform (e.g., using computing resource 225, processor 320, memory 330, storage component 340, and/or the like) may determine, based on the number of verifiable hours worked by the individual and the number of hours worked that has been credited to the individual, that an amount of wages paid to the individual is an incorrect amount of wages, as described above.

As further shown in FIG. 4, process 400 may include performing one or more actions based on determining that the amount of wages paid to the individual is the incorrect amount of wages (block 480). For example, the compliance platform (e.g., using computing resource 225, processor 320, memory 330, storage component 340, input component 350, output component 360, communication interface 370, and/or the like) may perform one or more actions based on determining that the amount of wages paid to the individual is the incorrect amount of wages, as described above.

Process 400 may include additional implementations, such as any single implementation or any combination of implementations described below and/or in connection with one or more other processes described elsewhere herein.

In some implementations, the compliance platform may filter the image data to remove sensitive information. In some implementations, when identifying the verifiable content, the compliance platform may identify the verifiable content by using the one or more content recognition techniques to process filtered image data.

In some implementations, when identifying the verifiable content, the compliance platform may process the image data to identify the user data that depicts at least a portion of the individual. In this case, identifying the user data may include identifying a set of characteristics of the individual. In some implementations, when determining the likelihood, the compliance platform may compare the set of characteristics of the individual and a set of configured characteristics of the individual, and may determine the likelihood that the individual is the particular employee or the particular agent of the organization based on comparing the set of characteristics of the individual and the set of configured characteristics.

In some implementations, when determining the one or more likelihoods, the compliance platform may determine that a first time, of the one or more times at which the image data was captured, is a scheduled work time. Additionally, the compliance platform may compare particular environment data, of the environment data that depicts at least the portion of the work environment and corresponding environment data, wherein the particular environment data was captured at the first time that is determined to be the scheduled work time. Additionally, the compliance platform may determine a particular likelihood that the individual is present at the work environment, during the first time, based on determining that the first time is the scheduled work time and based on comparing the particular environment data and the corresponding environment data.

In some implementations, the wages data may specify an hourly rate of the individual. In some implementations, when determining that the amount of wages paid to the individual is the incorrect amount of wages, the compliance platform may determine the amount of wages paid to the individual based on the wages data. Additionally, the compliance platform may determine a correct amount of wages based on the number of verifiable hours worked by the individual and the hourly rate of the individual, may compare the amount of wages paid to the individual and the correct amount of wages, and may determine that the amount of wages paid to the individual is the incorrect amount of wages based on comparing the amount of wages paid to the individual and the correct amount of wages.

In some implementations, the one or more likelihoods may be a first set of likelihoods. In some implementations, the compliance platform may determine, based on a machine-learning-driven analysis of the verifiable content, a second set of likelihoods that the individual completed one or more tasks during the given time period. In this case, the compliance platform may determine a particular amount of supplemental wages earned by the individual based on determining that the individual completed the one or more tasks during the given time period. In some implementations, when determining that the amount of wages paid to the individual is the incorrect amount of wages, the compliance platform may determine a correct amount of wages based on the number of verifiable hours worked by the individual, an hourly rate of the individual, and the particular amount of supplemental wages. Additionally, the compliance platform may compare the wages paid to the individual and the correct amount of wages, and may determine that the amount of wages paid to the individual is the incorrect amount of wages based on comparing the wages paid to the individual and the correct amount of wages.

In some implementations, when performing the one or more actions, the compliance platform may cause an account of the individual to be updated to reflect a correct amount of wages.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
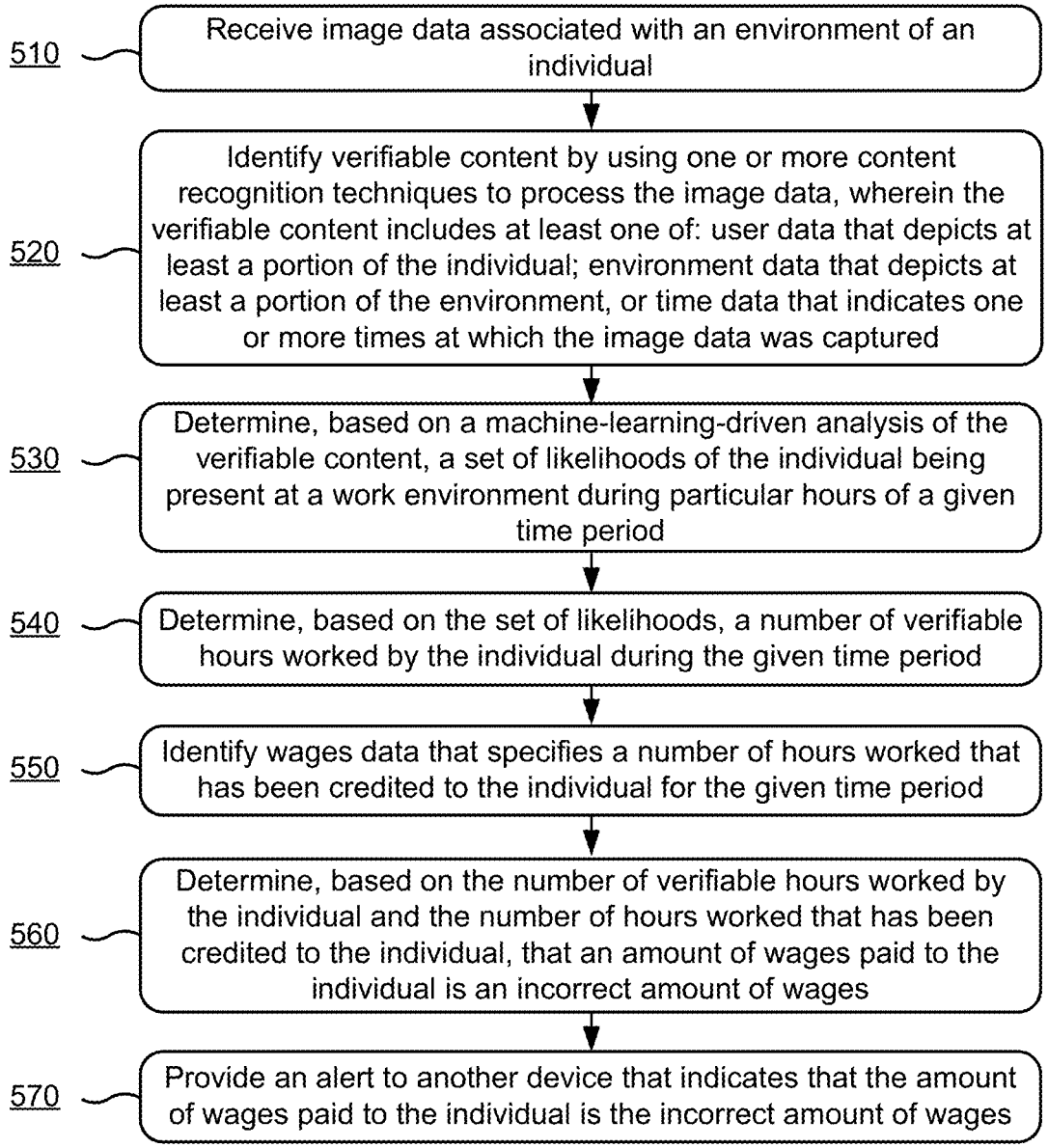

FIG. 5 is a flow chart of an example process 500 for using computer vision and/or machine learning to verify proof of work. In some implementations, one or more process blocks of FIG. 5 may be performed by a compliance platform (e.g., compliance platform 230). In some implementations, one or more process blocks of FIG. 5 may be performed by another device or a group of devices separate from or including the compliance platform, such as a data collection device (e.g., data collection device 210), a data storage device (e.g., data storage device 220), a user device (e.g., user device 250), and/or the like.

As shown in FIG. 5, process 500 may include receiving image data associated with an environment of an individual (block 510). For example, the compliance platform (e.g., using computing resource 225, processor 320, memory 330, storage component 340, input component 350, communication interface 370, and/or the like) may receive image data associated with an environment of an individual, as described above.

As further shown in FIG. 5, process 500 may include identifying verifiable content by using one or more content recognition techniques to process the image data, wherein the verifiable content includes at least one of: user data that depicts at least a portion of the individual, environment data that depicts at least a portion of the environment, or time data that indicates one or more times at which the image data was captured (block 520). For example, the compliance platform (e.g., using computing resource 225, processor 320, memory 330, storage component 340, and/or the like) may identify verifiable content by using one or more content recognition techniques to process the image data, as described above. In some implementations, the verifiable content may include at least one of: user data that depicts at least a portion of the individual; environment data that depicts at least a portion of the environment, or time data that indicates one or more times at which the image data was captured.

As further shown in FIG. 5, process 500 may include determining, based on a machine-learning-driven analysis of the verifiable content, a set of likelihoods of the individual being present at a work environment during particular hours of a given time period (block 530). For example, the compliance platform (e.g., using computing resource 225, processor 320, memory 330, storage component 340, and/or the like) may determine, based on a machine-learning-driven analysis of the verifiable content, a set of likelihoods of the individual being present at a work environment during particular hours of a given time period, as described above.

As further shown in FIG. 5, process 500 may include determining, based on the set of likelihoods, a number of verifiable hours worked by the individual during the given time period (block 540). For example, the compliance platform (e.g., using computing resource 225, processor 320, memory 330, storage component 340, and/or the like) may determine, based on the set of likelihoods, a number of verifiable hours worked by the individual during the given time period, as described above.

As further shown in FIG. 5, process 500 may include identifying wages data that specifies a number of hours worked that has been credited to the individual for the given time period (block 550). For example, the compliance platform (e.g., using computing resource 225, processor 320, memory 330, storage component 340, and/or the like) may identify wages data that specifies a number of hours worked that has been credited to the individual for the given time period, as described above.

As further shown in FIG. 5, process 500 may include determining, based on the number of verifiable hours worked by the individual and the number of hours worked that has been credited to the individual, that an amount of wages paid to the individual is an incorrect amount of wages (block 560). For example, the compliance platform (e.g., using computing resource 225, processor 320, memory 330, storage component 340, and/or the like) may determine, based on the number of verifiable hours worked by the individual and the number of hours worked that has been credited to the individual, that an amount of wages paid to the individual is an incorrect amount of wages, as described above.

As further shown in FIG. 5, process 500 may include providing an alert to another device that indicates that the amount of wages paid to the individual is the incorrect amount of wages (block 570). For example, the compliance platform (e.g., using computing resource 225, processor 320, memory 330, storage component 340, output component 360, communication interface 370, and/or the like) may provide an alert to another device (e.g., the user device) that indicates that the amount of wages paid to the individual is the incorrect amount of wages, as described above.

Process 500 may include additional implementations, such as any single implementation or any combination of implementations described below and/or in connection with one or more other processes described elsewhere herein.

In some implementations, one or more functions used to perform one or more steps described herein may be performed by the data collection device, which may be smart glasses (e.g., rather than the one or more steps being performed by the compliance platform). In some implementations, when receiving the image data, the compliance platform may receive the image data from smart glasses (e.g., and may perform functions associated with one or more steps described herein).

In some implementations, the compliance platform may process the image data to identify a set of pixels that represent sensitive information. In some implementations, the compliance platform may modify the set of pixels in a manner that removes or obscures the sensitive information. In some implementations, when identifying the verifiable content, the compliance platform may identify the verifiable content within the set of pixels that has been modified.

In some implementations, the environment data may include at least one of: data identifying a user device, data identifying particular content displayed via the user device, data identifying a piece of equipment, or data identifying a product.

In some implementations, the compliance platform may process the user data that depicts at least the portion of the individual to identify a set of characteristics of the individual, may compare the set of characteristics of the individual and a set of configured characteristics of the individual, and may determine a likelihood that the individual is a particular employee or a particular agent of an organization based on comparing the set of characteristics of the individual and the set of configured characteristics. In some implementations, when determining the number of verifiable hours worked by the individual, the compliance platform may determine the number of verifiable hours worked based on the likelihood and the set of likelihoods.

In some implementations, when determining that the amount of wages paid to the individual is the incorrect amount of wages, the compliance platform may determine a correct amount of wages based on the number of verifiable hours worked by the individual and an hourly rate of the individual, may compare the amount of wages paid to the individual and the correct amount of wages, and may determine that the amount of wages paid to the individual is the incorrect amount of wages based on comparing the amount of wages paid to the individual and the correct amount of wages.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
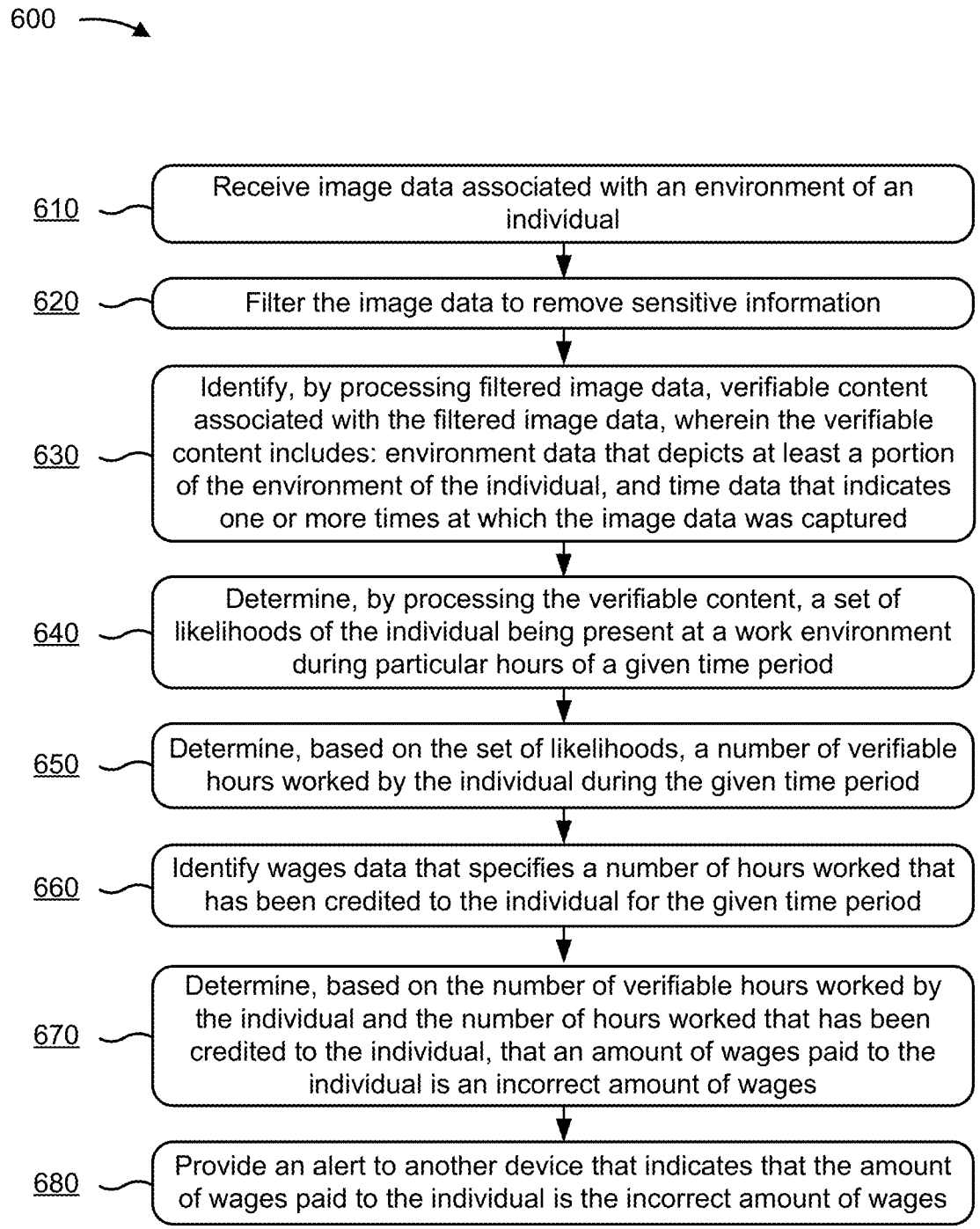

FIG. 6 is a flow chart of an example process 600 for using computer vision and/or machine learning to verify proof of work. In some implementations, one or more process blocks of FIG. 6 may be performed by a compliance platform (e.g., compliance platform 230). In some implementations, one or more process blocks of FIG. 6 may be performed by another device or a group of devices separate from or including the compliance platform, such as a data collection device (e.g., data collection device 210), a data storage device (e.g., data storage device 220), a user device (e.g., user device 250), and/or the like.

As shown in FIG. 6, process 600 may include receiving image data associated with an environment of an individual (block 610). For example, the compliance platform (e.g., using computing resource 225, processor 320, memory 330, storage component 340, input component 350, communication interface 370, and/or the like) may receive image data associated with an environment of an individual, as described above.

As further shown in FIG. 6, process 600 may include filtering the image data to remove sensitive information (block 620). For example, the compliance platform (e.g., using computing resource 225, processor 320, memory 330, storage component 340, and/or the like) may filter the image data to remove sensitive information, as described above.

As further shown in FIG. 6, process 600 may include identifying, by processing filtered image data, verifiable content associated with the filtered image data, wherein the verifiable content includes environment data that depicts at least a portion of the environment of the individual, and time data that indicates one or more times at which the image data was captured (block 630). For example, the compliance platform (e.g., using computing resource 225, processor 320, memory 330, storage component 340, and/or the like) may identify, by processing filtered image data, verifiable content within the filtered image data, as described above. In some implementations, the verifiable content may include: environment data that depicts at least a portion of the environment of the individual, and time data that indicates one or more times at which the image data was captured.

As further shown in FIG. 6, process 600 may include determining, by processing the verifiable content, a set of likelihoods of the individual being present at a work environment during particular hours of a given time period (block 640). For example, the compliance platform (e.g., using computing resource 225, processor 320, memory 330, storage component 340, and/or the like) may determine, by processing the verifiable content, a set of likelihoods of the individual being present at a work environment during particular hours of a given time period, as described above.

As further shown in FIG. 6, process 600 may include determining, based on the set of likelihoods, a number of verifiable hours worked by the individual during the given time period (block 650). For example, the compliance platform (e.g., using computing resource 225, processor 320, memory 330, storage component 340, and/or the like) may determine, based on the set of likelihoods, a number of verifiable hours worked by the individual during the given time period, as described above.

As further shown in FIG. 6, process 600 may include identifying wages data that specifies a number of hours worked that has been credited to the individual for the given time period (block 660). For example, the compliance platform (e.g., using computing resource 225, processor 320, memory 330, storage component 340, and/or the like) may identify wages data that specifies a number of hours worked that has been credited to the individual for the given time period, as described above.

As further shown in FIG. 6, process 600 may include determining, based on the number of verifiable hours worked by the individual and the number of hours worked that has been credited to the individual, that an amount of wages paid to the individual is an incorrect amount of wages (block 670). For example, the compliance platform (e.g., using computing resource 225, processor 320, memory 330, storage component 340, and/or the like) may determine, based on the number of verifiable hours worked by the individual and the number of hours worked that has been credited to the individual, that an amount of wages paid to the individual is an incorrect amount of wages, as described above.

As further shown in FIG. 6, process 600 may include providing an alert to another device that indicates that the amount of wages paid to the individual is the incorrect amount of wages (block 680). For example, the compliance platform (e.g., using computing resource 225, processor 320, memory 330, storage component 340, output component 360, communication interface 370, and/or the like) may provide an alert to the user device that indicates that the amount of wages paid to the individual is the incorrect amount of wages, as described above.

Process 600 may include additional implementations, such as any single implementation or any combination of implementations described below and/or in connection with one or more other processes described elsewhere herein.

In some implementations, the image data may be obtained by a wearable device associated with the individual. In some implementations, when filtering the image data to remove the sensitive information, the compliance platform may identify a set of pixels that represent particular sensitive information and may modify the set of pixels in a manner that removes or obscures the particular sensitive information.

In some implementations, when determining the set of likelihoods, the compliance platform may provide the verifiable content as input to a data model to cause the data model to output a set of confidence scores that indicate the set of likelihoods of the individual being present in the work environment for the given time period. In some implementations, the data model may have been trained using one or more machine learning techniques.

In some implementations, the verifiable content may further include user data that depicts at least a portion of the individual. In some implementations, the compliance platform may process the user data that depicts at least the portion of the individual to identify a set of characteristics of the individual, and may determine a likelihood that the individual is a particular employee or a particular agent of an organization based on the set of characteristics of the individual. In some implementations, when determining the number of verifiable hours worked by the individual, the compliance platform may determine the number of verifiable hours worked based on the likelihood and the set of likelihoods.

In some implementations, when providing the alert to the user device, the compliance platform may provide the alert to the user device to cause the user device to perform one or more actions to cause an account of the individual to be updated to reflect a correct amount of wages.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a device, image data associated with an environment of an individual,
      wherein the image data is received from a wearable device associated with the individual;
   identifying, by the device and using a data model, sensitive information in the image data;
   filtering, by the device, the image data to obscure the sensitive information by changing a first color of pixels that are part of the sensitive information to a second color;
   identifying, by the device, verifiable content by using one or more content recognition techniques to process the filtered image data,
      wherein the verifiable content includes:
         user data that depicts at least a portion of the individual,
         environment data that depicts at least a portion of the environment, and
         time data that indicates one or more times at which the image data was captured;
   determining, by the device and by processing the verifiable content, a threshold likelihood that the individual is a particular employee or a particular agent of an organization;
   determining, by the device and by processing the verifiable content, one or more threshold likelihoods of the environment depicted by the image data being a work environment;

determining, by the device and based on the threshold likelihood and the one or more threshold likelihoods, a number of verifiable hours worked by the individual during a given time period;

identifying, by the device, wages data that specifies a number of hours worked that has been credited to the individual for the given time period;

determining, by the device and based on the number of verifiable hours worked by the individual and the number of hours worked that has been credited to the individual, whether an amount of wages paid to the individual is an incorrect amount of wages; and performing, by the device, an update to reflect a correct amount of wages based on determining that the amount of wages paid to the individual is the incorrect amount of wages.

2. The method of claim 1, wherein identifying the verifiable content comprises:

processing the filtered image data to identify the user data that depicts at least a portion of the individual,
wherein identifying the user data comprises identifying a set of characteristics of the individual; and wherein determining the threshold likelihood comprises:

comparing the set of characteristics of the individual with a set of configured characteristics of the individual, and determining the threshold likelihood that the individual is the particular employee or the particular agent of the organization based on comparing the set of characteristics of the individual with the set of configured characteristics.

3. The method of claim 1, wherein determining the one or more threshold likelihoods comprises:

determining that a first time, of the one or more times at which the image data was captured, is a scheduled work time;

comparing particular environment data, of the environment data that depicts at least the portion of the work environment, and corresponding environment data,
wherein the particular environment data was captured at the first time that is determined to be the scheduled work time; and determining a particular threshold likelihood that the individual is present at the work environment, during the first time, based on determining that the first time is the scheduled work time and based on comparing the particular environment data and the corresponding environment data.

4. The method of claim 1, wherein the wages data further specifies an hourly rate of the individual;

wherein determining that the amount of wages paid to the individual is the incorrect amount of wages comprises:

determining the amount of wages paid to the individual based on the wages data, determining the correct amount of wages based on the number of verifiable hours worked by the individual and the hourly rate of the individual, comparing the amount of wages paid to the individual and the correct amount of wages, and determining that the amount of wages paid to the individual is the incorrect amount of wages based on comparing the amount of wages paid to the individual and the correct amount of wages.

5. The method of claim 1, wherein the one or more threshold likelihoods are a first set of threshold likelihoods; wherein the method further comprises:

determining, based on a machine-learning-driven analysis of the verifiable content, a second set of threshold likelihoods that the individual completed one or more tasks during the given time period, determining a particular amount of supplemental wages earned by the individual based on determining that the individual completed the one or more tasks during the given time period; and wherein determining that the amount of wages paid to the individual is the incorrect amount of wages comprises:

determining the correct amount of wages based on the number of verifiable hours worked by the individual, an hourly rate of the individual, and the particular amount of supplemental wages, comparing the wages paid to the individual and the correct amount of wages, and determining that the amount of wages paid to the individual is the incorrect amount of wages based on comparing the wages paid to the individual and the correct amount of wages.

6. The method of claim 1, wherein performing the update to reflect the correct amount of wages comprises:

causing an account of the individual to be updated to reflect the correct amount of wages.

7. A device, comprising:

one or more memories; and one or more processors communicatively coupled to the one or more memories, configured to:

receive image data associated with an environment of an individual,
wherein the image data is received from a wearable device associated with the individual;

identify, using a data model, sensitive information in the image data;

filter, by the device, the image data to obscure the sensitive information by changing a first color of pixels that are part of the sensitive information to a second color;

identify verifiable content by using one or more content recognition techniques to process the filtered image data,
wherein the verifiable content includes:
user data that depicts at least a portion of the individual,
environment data that depicts at least a portion of the environment, and
time data that indicates one or more times at which the image data was captured;

determine, by processing the verifiable content, a threshold likelihood that the individual is a particular employee or a particular agent of an organization;

determine, by processing the verifiable content, one or more threshold likelihoods of the environment depicted by the image data being a work environment;

determine, based on the threshold likelihood and the one or more threshold likelihoods, a number of verifiable hours worked by the individual during a given time period;

identify wages data that specifies a number of hours worked that has been credited to the individual for the given time period;

determine, based on the number of verifiable hours worked by the individual and the number of hours worked that has been credited to the individual, whether an amount of wages paid to the individual is an incorrect amount of wages; and perform an update to reflect a correct amount of wages based on determining that the amount of wages paid to the individual is the incorrect amount of wages.

8. The device of claim 7,
wherein the one or more processors, when identifying the verifiable content, are configured to:
process the filtered image data to identify the user data that depicts at least a portion of the individual,
wherein the one or more processors, when identifying the user data, are configured to identify a set of characteristics of the individual; and
wherein the one or more processors, when determining the threshold likelihood, are configured to:
compare the set of characteristics of the individual with a set of configured characteristics of the individual, and
determine the threshold likelihood that the individual is the particular employee or the particular agent of the organization based on comparing the set of characteristics of the individual with the set of configured characteristics.

9. The device of claim 7, wherein the one or more processors, when determining the one or more threshold likelihoods, are configured to:
determine that a first time, of the one or more times at which the image data was captured, is a scheduled work time;
compare particular environment data, of the environment data that depicts at least the portion of the work environment, and corresponding environment data, wherein the particular environment data was captured at the first time that is determined to be the scheduled work time; and
determine a particular threshold likelihood that the individual is present at the work environment, during the first time, based on determining that the first time is the scheduled work time and based on comparing the particular environment data and the corresponding environment data.

10. The device of claim 7, wherein the wages data further specifies an hourly rate of the individual;
wherein the one or more processors, when determining that the amount of wages paid to the individual is the incorrect amount of wages, are configured to:
determine the amount of wages paid to the individual based on the wages data,
determine the correct amount of wages based on the number of verifiable hours worked by the individual and the hourly rate of the individual,
compare the amount of wages paid to the individual and the correct amount of wages, and
determine that the amount of wages paid to the individual is the incorrect amount of wages based on comparing the amount of wages paid to the individual and the correct amount of wages.

11. The device of claim 7, wherein the one or more threshold likelihoods are a first set of threshold likelihoods;
wherein the one or more processors are further configured to:
determine, based on a machine-learning-driven analysis of the verifiable content, a second set of threshold likelihoods that the individual completed one or more tasks during the given time period,
determine a particular amount of supplemental wages earned by the individual based on determining that the individual completed the one or more tasks during the given time period; and wherein the one or more processors, when determining that the amount of wages paid to the individual is the incorrect amount of wages, are configured to:
determine the correct amount of wages based on the number of verifiable hours worked by the individual, an hourly rate of the individual, and the particular amount of supplemental wages,
compare the wages paid to the individual and the correct amount of wages, and
determine that the amount of wages paid to the individual is the incorrect amount of wages based on comparing the wages paid to the individual and the correct amount of wages.

12. The device of claim 7,
wherein the one or more processors, when performing the update to reflect the correct amount of wages, are configured to:
cause an account of the individual to be updated to reflect the correct amount of wages.

13. A non-transitory computer-readable medium storing instructions, the instructions comprising:
one or more instructions that, when executed by one or more processors, cause the one or more processors to:
receive image data associated with an environment of an individual,
wherein the image data is received from a wearable device associated with the individual;
identify, using a data model, sensitive information in the image data;
filter the image data to obscure the sensitive information by changing a first color of pixels that are part of the sensitive information to a second color;
identify verifiable content by using one or more content recognition techniques to process the filtered image data,
wherein the verifiable content includes at least one of,
user data that depicts at least a portion of the individual,
environment data that depicts at least a portion of the environment, and
time data that indicates one or more times at which the image data was captured;
determine, by processing the verifiable content, a threshold likelihood that the individual is a particular employee or a particular agent of an organization;
determine, by processing the verifiable content, one or more threshold likelihoods of the environment depicted by the image data being a work environment;
determine, based on the threshold likelihood and the one or more threshold likelihoods, a number of verifiable hours worked by the individual during a given time period;
identify wages data that specifies a number of hours worked that has been credited to the individual for the given time period;
determine, based on the number of verifiable hours worked by the individual and the number of hours worked that has been credited to the individual, whether an amount of wages paid to the individual is an incorrect amount of wages; and
perform an update to reflect a correct amount of wages based on determining that the amount of wages paid to the individual is the incorrect amount of wages.

14. The non-transitory computer-readable medium of claim 13, wherein the one or more instructions, that cause the one or more processors to identify the verifiable content, cause the one or more processors to:
> process the filtered image data to identify the user data that depicts at least a portion of the individual,
> > wherein the one or more instructions, that cause the one or more processors to identifying the user data, cause the one or more processors to identify a set of characteristics of the individual; and
> wherein the one or more instructions, that cause the one or more processors to determine the threshold likelihood, cause the one or more processors to:
> > compare the set of characteristics of the individual with a set of configured characteristics of the individual, and
> > determine the threshold likelihood that the individual is the particular employee or the particular agent of the organization based on comparing the set of characteristics of the individual with the set of configured characteristics.

15. The non-transitory computer-readable medium of claim 13, wherein the one or more instructions, that cause the one or more processors to determine the one or more threshold likelihoods, cause the one or more processors to:
> determine that a first time, of the one or more times at which the image data was captured, is a scheduled work time;
> compare particular environment data, of the environment data that depicts at least the portion of the work environment, and corresponding environment data,
> > wherein the particular environment data was captured at the first time that is determined to be the scheduled work time; and
> determine a particular threshold likelihood that the individual is present at the work environment, during the first time, based on determining that the first time is the scheduled work time and based on comparing the particular environment data and the corresponding environment data.

16. The non-transitory computer-readable medium of claim 13, wherein the wages data further specifies an hourly rate of the individual;
> wherein the one or more instructions, that cause the one or more processors to determine that the amount of wages paid to the individual is the incorrect amount of wages, cause the one or more processors to:
> > determine the amount of wages paid to the individual based on the wages data,
> > determine the correct amount of wages based on the number of verifiable hours worked by the individual and the hourly rate of the individual,
> > compare the amount of wages paid to the individual and the correct amount of wages, and determine that the amount of wages paid to the individual is the incorrect amount of wages based on comparing the amount of wages paid to the individual and the correct amount of wages.

17. The non-transitory computer-readable medium of claim 13, wherein the one or more threshold likelihoods are a first set of threshold likelihoods;
> wherein the one or more instructions further cause the one or more processors to:
> > determine, based on a machine-learning-driven analysis of the verifiable content, a second set of threshold likelihoods that the individual completed one or more tasks during the given time period,
> > determine a particular amount of supplemental wages earned by the individual based on determining that the individual completed the one or more tasks during the given time period; and
> wherein the one or more instructions, that cause the one or more processors to determine that the amount of wages paid to the individual is the incorrect amount of wages, cause the one or more processors to:
> > determine the correct amount of wages based on the number of verifiable hours worked by the individual, an hourly rate of the individual, and the particular amount of supplemental wages,
> > compare the wages paid to the individual and the correct amount of wages, and
> > determine that the amount of wages paid to the individual is the incorrect amount of wages based on comparing the wages paid to the individual and the correct amount of wages.

18. The method of claim 1, wherein the sensitive information includes one or more of:
> image data identifying a particular individual who has not consented to being recorded,
> audio data of the particular individual who has not consented to being recorded, or
> image data identifying personal information of the particular individual who has not consented to being recorded.

19. The device of claim 7, wherein the sensitive information includes one or more of:
> image data identifying a particular individual who has not consented to being recorded,
> audio data of the particular individual who has not consented to being recorded, or
> image data identifying personal information of the particular individual who has not consented to being recorded.

20. The non-transitory computer-readable medium of claim 13, wherein the sensitive information includes one or more of:
> image data identifying a particular individual who has not consented to being recorded,
> audio data of the particular individual who has not consented to being recorded, or
> image data identifying personal information of the particular individual who has not consented to being recorded.

* * * * *